United States Patent [19]
Murakami et al.

[11] Patent Number: 6,143,262
[45] Date of Patent: Nov. 7, 2000

[54] PROCESS FOR REMOVING NITROUS OXIDE ($N_2O$)

[75] Inventors: Yuichi Murakami; Tadashi Hattori; Atsushi Satsuma; Hideaki Muramatsu, all of Nagoya; Katsuhiro Tokura, Handa; Takayuki Mori, Nagoya, all of Japan

[73] Assignees: NGK Insulators, Ltd.; Yuichi Murakami, both of Japan

[21] Appl. No.: 08/545,613

[22] PCT Filed: Mar. 7, 1995

[86] PCT No.: PCT/JP95/00363

§ 371 Date: Oct. 25, 1995

§ 102(e) Date: Oct. 25, 1995

[87] PCT Pub. No.: WO95/24258

PCT Pub. Date: Sep. 14, 1995

[30] Foreign Application Priority Data

Mar. 7, 1994 [JP] Japan .................................. 6-035816

[51] Int. Cl.[7] .......................................................... B01J 8/00
[52] U.S. Cl. ........................................................... 423/239.1
[58] Field of Search ................................. 423/235, 239.1

[56] References Cited

U.S. PATENT DOCUMENTS 4,259,303  3/1981  Nakaji et al. ......................... 423/239.1

FOREIGN PATENT DOCUMENTS

| | | |
|---|---|---|
| 0 256 822 | 2/1988 | European Pat. Off. . |
| 60-22922 | 2/1985 | Japan . |
| 63-111929 | 5/1988 | Japan . |
| 4-135645 | 5/1992 | Japan . |
| 4-363143 | 12/1992 | Japan . |
| 829581 | 3/1960 | United Kingdom . |
| WO 94/16798 | 8/1994 | WIPO . |

OTHER PUBLICATIONS

Winter, "The Decomposition of $N_2O$ on Oxide Catalysts III. The Effect of $O_2$" 1974 (no month) pp. 434–439.

*Primary Examiner*—Tom Dunn
*Attorney, Agent, or Firm*—Parkhurst & Wendel, L.L.P

[57] ABSTRACT

Nitrous oxide contained in a gas is directly decomposed by contacting the gas with a catalyst layer composed mainly of tin (IV) oxide at a reaction temperature of not less than 250° C., preferably not less than 300° C. Particularly when a cobalt (II) compound is added to the catalyst layer, nitrous oxide can be effectively removed to a low concentration by contacting the gas with the catalyst layer at the reaction temperature of not less than 200° C., preferably not less than 300° C. By the present process, nitrous oxide which has not conventionally effectively removed can be reliably removed at a low cost. The present process can be applied for the removal of nitrous oxide in exhaust gases discharged from a sludge-incinerating furnace, a boiler fine powder coal combustion furnace, etc.

11 Claims, 7 Drawing Sheets

1. Gas control unit
2. Reacting glass tube
3. Catalyst-filled layer
4. Temperature-keeping ribbon heater
5. Ice bath type noisture-removing trap
6. Gas chromatograph
7. Sand flow layer for heating reacting tube

FIG_2

FIG_3

FIG_4

PROCESS FOR REMOVING NITROUS OXIDE (N₂O)

This Application is a 371 of PCT/JP95/00363 filed Mar. 7, 1995, based on JP 6-35,816, filed Mar. 7, 1994.

BACKGROUND ART

Nitrous oxide ($N_2O$) is generated at the time of the combustion in an incineration furnace, a boiler, etc. and is discharged together with exhaust gases. Since the discharged amount of nitrous oxide is small and it does not cause acidic rain, nitrous oxide has been discharged outside without much attention as it is. However, since nitrous oxide is a stable compound having a long bench life more than 150 years, the concentration of nitrous oxide in air has been conspicuously increasing over these years. Further, recent investigations revealed that nitrous oxide is a temperature-raising gas, and causes the ozone layer to be broken. Therefore, it is important to remove nitrous oxide from the exhaust gases in the incineration furnace, etc. from the standpoint of protecting the environment.

As mentioned above, nitrous oxide is a relatively stable compound, and has low reactivity with other compounds. Therefore, nitrous oxide cannot be removed from the exhaust gases in the incineration furnace by a neutralizing agent-adding process unlike the removal of hydrogen chloride (HCl) or oxides of sulfur (SOx). Further, a divanadium pentaoxide ($V_2O_5$-based denitriding catalyst) to be ordinarily used for the decomposition of oxides of nitride (NOx) exhibits excellent activity with respect to nitric oxide (NO) and nitric dioxide ($NO_2$), but does not exhibit activity to nitrous oxide ($N_2O$). For this reason, the conventional techniques cannot be adopted for the removal of nitrous oxide.

Under the circumstances, JP-A 60-22922 discloses a process for decomposing nitrous oxide by reduction with use of ammonia as a reducing agent, and JP-A 4-363143 discloses a process for directly decomposing nitrous oxide with use of a zeolite-based catalyst. However, since the former process needs an excess amount of ammonia, non-reacted ammonia is unfavorably discharged into air. In the latter process, since the activity of the catalyst is low, a high reaction temperature is unfavorably required. Further, since a large cost is necessary for the preparation of the catalyst in each of these processes, the running cost consequently becomes higher for exchanging the catalyst layer due to deactivation of catalyst.

Furthermore, since nitrous oxide is produced when in coexistence with NOx, SOx and water, it is preferable to remove nitrous oxide after the removal of NOx and SOx. However, since the conventional catalysts have low activity and require very high reaction temperatures, it is difficult to arrange the nitrous oxide-decomposing catalyst layer, for example, downstream the denitriding catalyst.

In addition, it is difficult to completely remove SOx in the current exhaust gas disposal system, so that even the exhaust gas having undergone the desulfurizing treatment contains a little amount of SOx. Consequently, in many zeolite-based catalysts, their structures are poisoned or broken so that the activity unfavorably drops. In this way, it is an actual situation that no satisfactory process is now available to remove nitrous oxide from the exhaust gases.

DISCLOSURE OF THE INVENTION

The present invention is to solve the conventional problems mentioned above, and to provide a process for reliably removing nitrous oxide in exhaust gases at a low cost without being influenced by a coexisting material.

A first invention made so as to solve the above problems is characterized in that nitrous oxide contained in a gas is directly decomposed by contacting the gas with a catalyst layer composed mainly of tin (IV) oxide ($SnO_2$) at a reaction temperature of not less than 250° C., preferably not less than 350° C., without particularly using a reducing agent. Further, a second invention is characterized in that nitrous oxide in the exhaust gas is directly decomposed by contacting the gas with a catalyst mainly composed of tin (IV) oxide ($SnO_2$) and added with a cobalt (II) compound (CoO) as a co-catalyst at a reaction temperature of not less than 200° C., preferably not less than 300° C. in the gas disposal process for the removal of nitrous oxide in the gas through contacting the gas with the catalyst layer.

According to the present invention, nitrous oxide is decomposed by contacting the gas with the catalyst layer composed mainly of tin oxide.

As mentioned above, since nitrous oxide is produced in coexistence with NOx, SOx and water, it is preferable to contact the exhaust gas with the catalyst layer after the removal of NOx and SOx. The catalyst to be used in the present invention has a reaction temperature of not less than 250° C., preferably not less than 350° C. In the case of the catalyst composed mainly of tin (IV) oxide and added with the cobalt compound (II) as a co-catalyst, nitrous oxide can be effectively decomposed by contacting the gas with the catalyst at the reaction temperature of not less than 200° C., more preferably not less than 300° C.

Further, although SOx remains in the ordinary exhaust gas-treating system after the desulfurization, the tin oxide catalyst in the present invention is not poisoned, so that its activity is not lost even in the exhaust gas having a high concentration of SOx. In addition, as compared with platinum, rhodium, etc., the cost for the preparation of tin oxide as a material for the catalyst is far cheaper. Therefore, the running cost can be reduced for exchanging the catalysts.

A cobalt compound may be added into tin (IV) oxide as an auxiliary catalyst by using cobalt acetate, cobalt nitrate or the like. These compounds exhibit almost the same effect, although their firing temperatures differ. As compared with tin or cobalt alone, the resulting catalyst remarkably enhances the reaction activity. Thus, it is considered that the arrangement of the atoms changes through interaction between tin and cobalt at the time of firing. The addition amount of the cobalt compound is preferably 0.5 to 5% by weight, more preferably 1 to 3% by weight with respect to 100% by weight of tin (IV) oxide.

$N_2O$ taken as the problem in the present invention is often generated at the time of combustion at a low temperature or when a material to be burnt contains much nitrogen. Therefore, an $N_2O$-containing exhaust gas is often produced from a sludge-incinerating furnace, a boiler fine coal combustion furnace, etc. The nitrous oxide-removing process according to the present invention is suitable particularly for these cases.

The catalyst layer to be used in the process of the present invention is produced, for example, in the following way.

When the catalyst-producing process is of a small scale at a laboratory level, only tin oxide is formed. In this case, powdery tin oxide is press molded in the form of pellets, which is milled and screened to obtain 28 to 48 mesh powder. The resulting powder is fired at 500 to 700° C. for 3 to 6 hours to produce a given shape of a catalyst layer. When cobalt is added as a co-catalyst, cobalt acetate is dissolved into an aqueous slurry in which powdery tin oxide is suspended, and a powdery mixture is obtained by drying and converted into a given shape of a catalyst layer by similar steps. When the catalyst is to be carried on titanium oxide, powdery titanium oxide is put into an ethyl alcohol solution of tin chloride, and a catalyst layer having a given shape is obtained from a dried powder by similar steps.

When the catalyst is used for an actual incinerator furnace, a honeycomb carrier made of titanium oxide is immersed into and impregnated with an ethyl alcohol solution of tin chloride, which is dried and fired at 500 to 700° C. for 3 to 6 hours. When cobalt is to be carried as a co-catalyst, such a honeycomb carrier is immersed into and impregnated with the ethyl alcohol solution of tin chloride. The resulting carrier is dried, and immersed into and impregnated with an aqueous solution of cobalt acetate, which is dried and fired at 500 to 700° C. for 3 to 6 hours.

According to the present invention, nitrous oxide contained in gases discharged from various furnaces can be effectively removed by contacting the gases with the catalyst layer composed mainly of tin oxide without using any reducing agent. Since the tin oxide catalyst is inexpensive and easy to handle, the running cost can be reduced. Further, since the reaction temperature can be lowered as compared with the conventional catalysts, nitrous oxide can be removed after the removal of NOx and SOx. Furthermore, when a cobalt compound is added, as a co-catalyst, to the catalyst composed mainly of tin oxide, nitrous oxide can be well removed at a lower temperature as compared with tin oxide alone.

BEST MODE FOR PRACTICING THE INVENTION

Experimental results are shown for confirming the effects of the present invention as follows:

EXAMPLE 1

Figure 1:
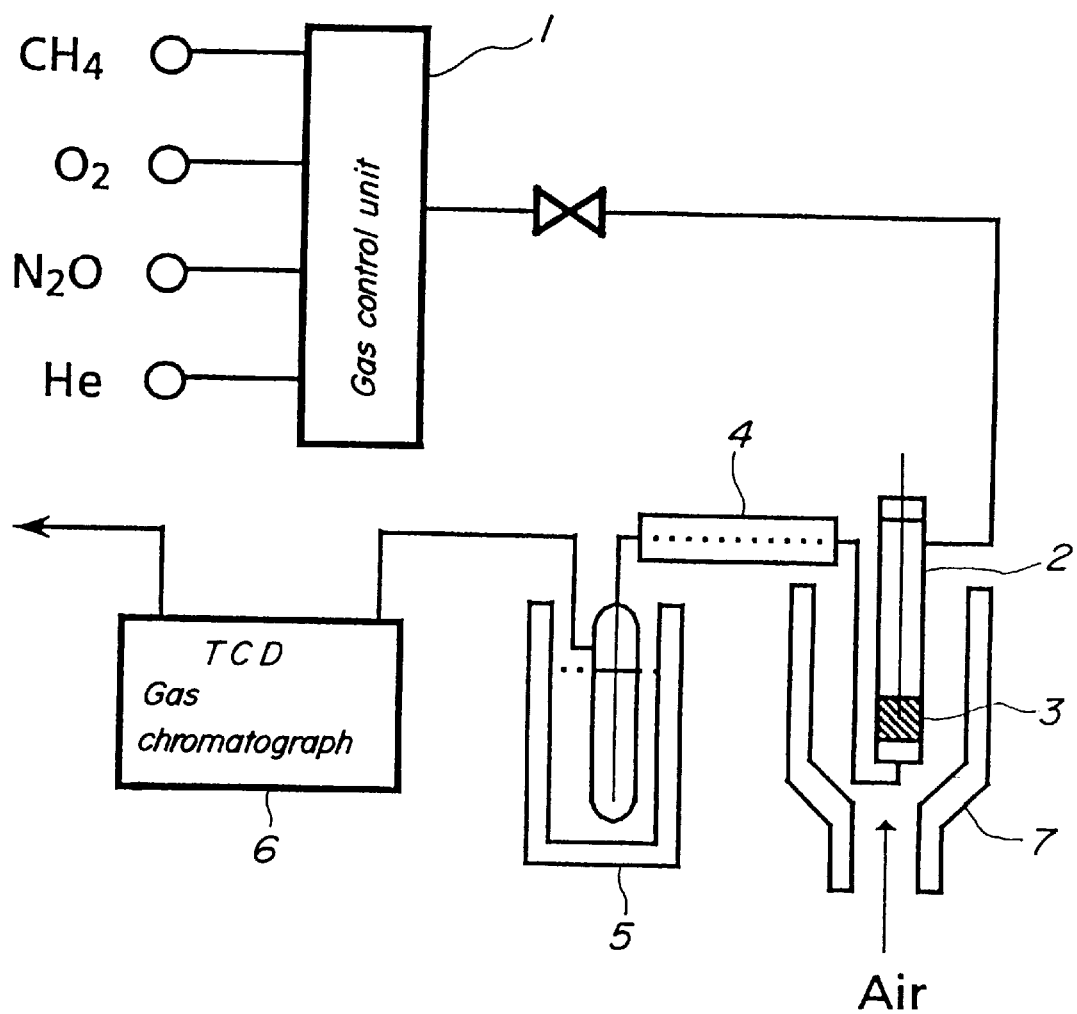
FIG. 1 is a sectional view for illustrating an apparatus used in connection with examples of the present invention.

An experiment for evaluating the performance of tin oxide alone was performed as shown in FIG. 1. That is, a gas prepared by a gas control unit 1 was passed through a catalyst-filled layer 3 in a reacting glass tube 2, and further passed, via a temperature-keeping ribbon heater 4, through an ice bath type moisture-removing trap 5 where moisture was removed. Then, components of the gas were analyzed by a gas chromatograph 6 equipped with a heat conductivity detector. The composition of the gas prepared was $N_2O$: 1%, $O_2$: 8% and the balance being He. The reacting glass tube 2 was placed inside a sand flow layer 7 for heating the reacting tube, and heated there at 150 to 550° C. As separating columns, charged Porapak type Q was used for carbon dioxide and nitrous oxide, and charged Molecularshive 13× was used for the other components.

As a catalyst, commercially available powdery tin oxide was press molded in the form of pellets, and powder obtained by crushing the pellets and screening the resultant at 24 to 48 meshes was used. The catalyst packed in the reacting glass tube was used after firing at 500° C. for 2 hours and spontaneous cooling as a preliminary treatment.

Figure 2:
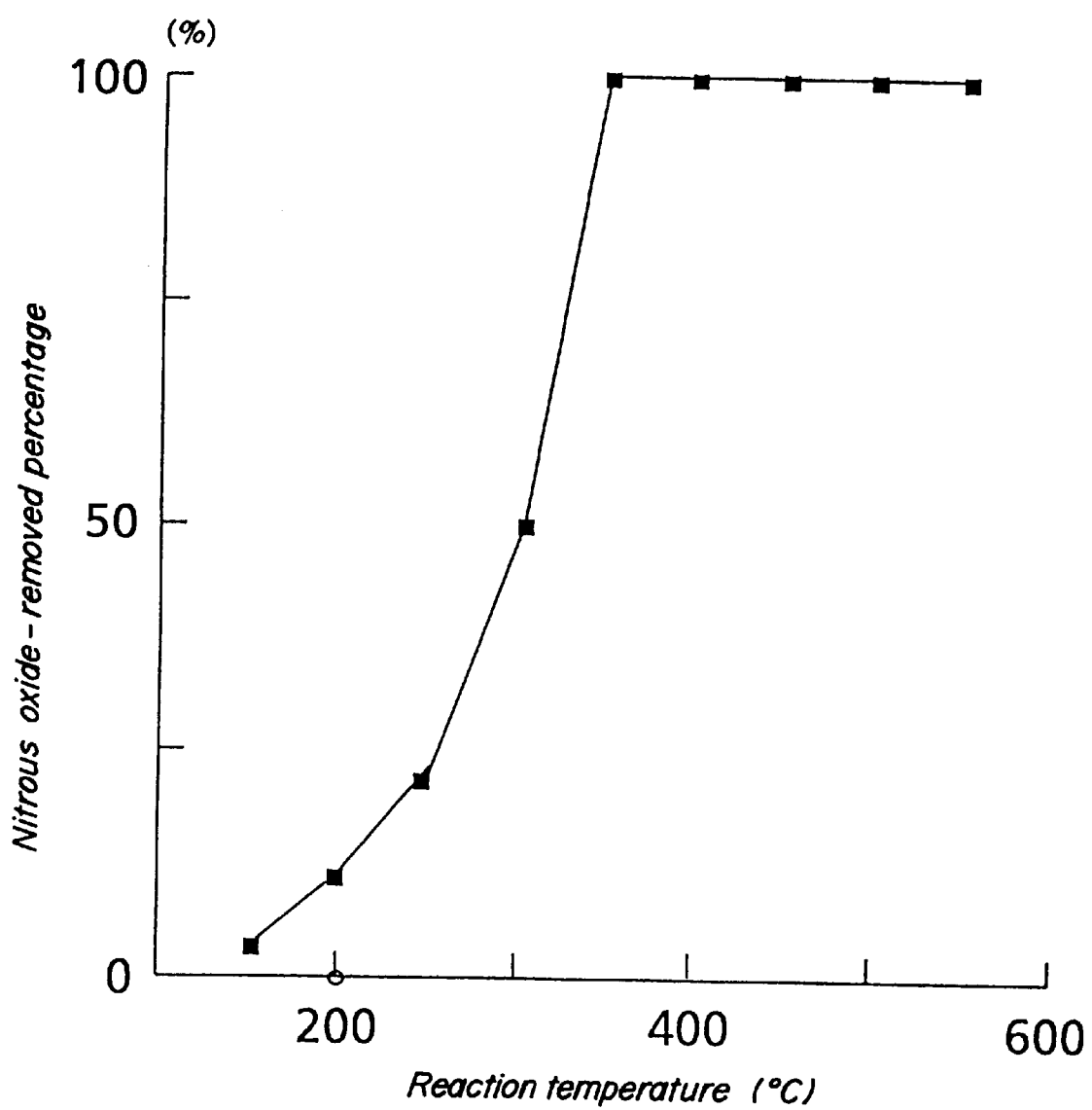
FIG. 2 is a diagram for showing the relationship between the reaction temperature and the nitrous oxide-removed percentage in Example 1.

Experimental results are shown in the diagram of FIG. 2. It was confirmed that nitrous oxide is removed at the reaction temperature of not less than 250° C., that when the reaction temperature is not less than 300° C., the nitrous oxide-removed percentage rapidly increases, and that nitrous oxide can be completely removed particularly when the reaction temperature is set at not less than 350° C.

EXAMPLE 2

A catalyst in which tin oxide was carried on a catalytic layer made of titanium oxide was experimentally evaluated in the same evaluation way as in Example 1. As the catalyst was used a catalyst which was obtained by dissolving commercially available tin oxide in ethyl alcohol, preparing a slurry through adding powdery titanium oxide into the solution, distilling off the solvent under reduced pressure, press molding the resultant in the form of pellets, crushing the pellets and screening the crushed powder at 24 to 48 meshes. The catalyst was used as packed in the reacting glass tube 2 after firing at 500° C. for 2 hours and spontaneous cooling as a preliminary treatment.

Figure 3:
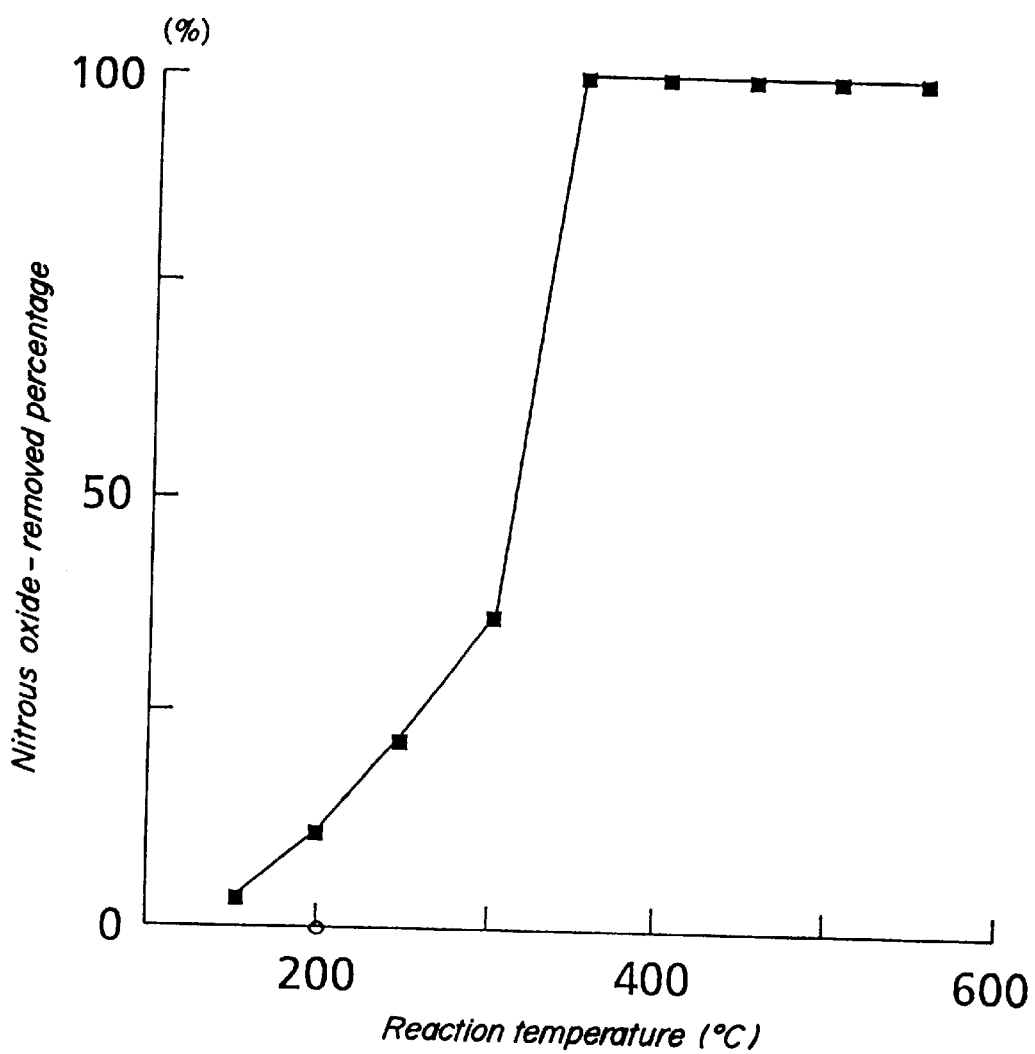
FIG. 3 is a graph for showing the relationship between the temperature and the nitrous oxide-removed percentage in Example 2.

Experimental results are shown in the graph of FIG. 3. It was confirmed that nitrous oxide is removed at the reaction temperature of not less than 250° C., that when the reaction temperature is not less than 300° C., the nitrous oxide-removed percentage rapidly increases, and that nitrous oxide can be completely removed particularly when the reaction temperature is set at not less than 350° C.

EXAMPLE 3

A catalyst in which tin oxide was carried on a catalyst layer made of titanium oxide was experimentally evaluated by using a gas actually discharged from a sludge-incinerating furnace. This exhaust gas is an exhaust gas which has undergone wet type desulfurizing treatment and was composed mainly of nitrogen, oxygen, moisture, carbon dioxide, etc. as well as remaining $SO_2$, hydrogen chloride, carbon monoxide, hydrocarbon, etc. As the catalyst was used a catalyst which was obtained by dissolving commercially available tin oxide in ethyl alcohol, impregnating the resulting solution into the catalyst layer made of titanium oxide and firing the resultant at 500° for 6 hours.

Figure 4:
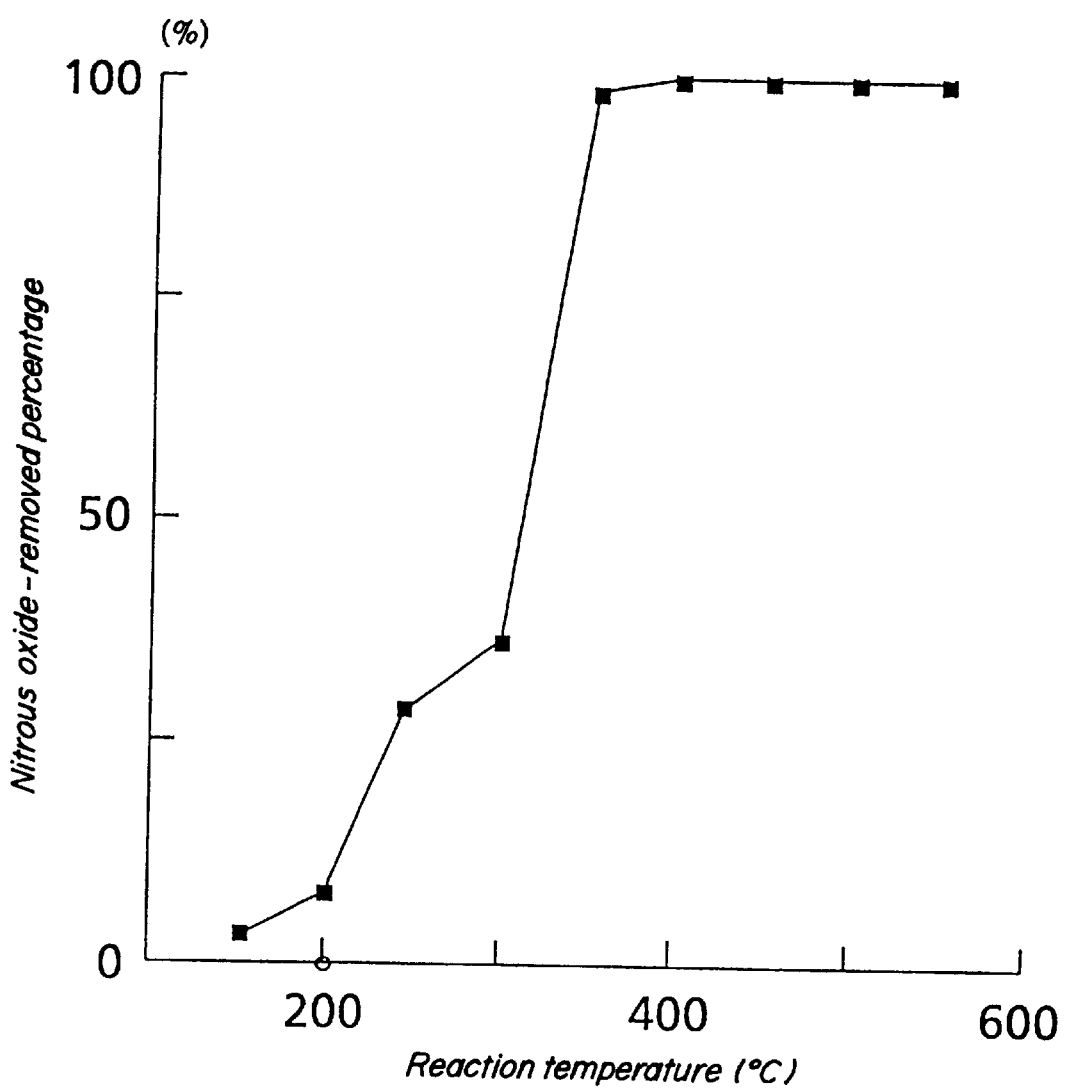
FIG. 4 is a graph for showing the relationship between the reaction temperature and the nitrous oxide-removed percentage in Example 3.

Experimental results are shown in the graph of FIG. 4. It was confirmed that nitrous oxide is removed at the reaction temperature of not less than 250° C., that when the reaction temperature is not less than 300° C., the nitrous oxide-removed percentage increases, and that nitrous oxide can be completely removed particularly when the reaction temperature is set at not less than 400° C. It was also confirmed that the present process is free from influence with other materials coexisting in the exhaust gas.

EXAMPLE 4

The performance of a catalyst in which a cobalt compound was added to tin oxide was experimentally evaluated in the same evaluation method as in Example 1. As the catalyst was used a catalyst which was obtained by feeding commercially available powdery tin oxide into distilled water to obtain a slurry, adding cobalt acetate as a co-catalyst to the slurry in an amount of 1%, distilling off the solvent under reduced pressure, press molding the powder in the form of pellets, crushing the pellets and screening the powder at 28 to 48 meshes. The catalyst was used as packed in the reacting glass tube 2 after firing at 550° C. for 2 hours and spontaneous cooling as a preliminary treatment.

Figure 5:
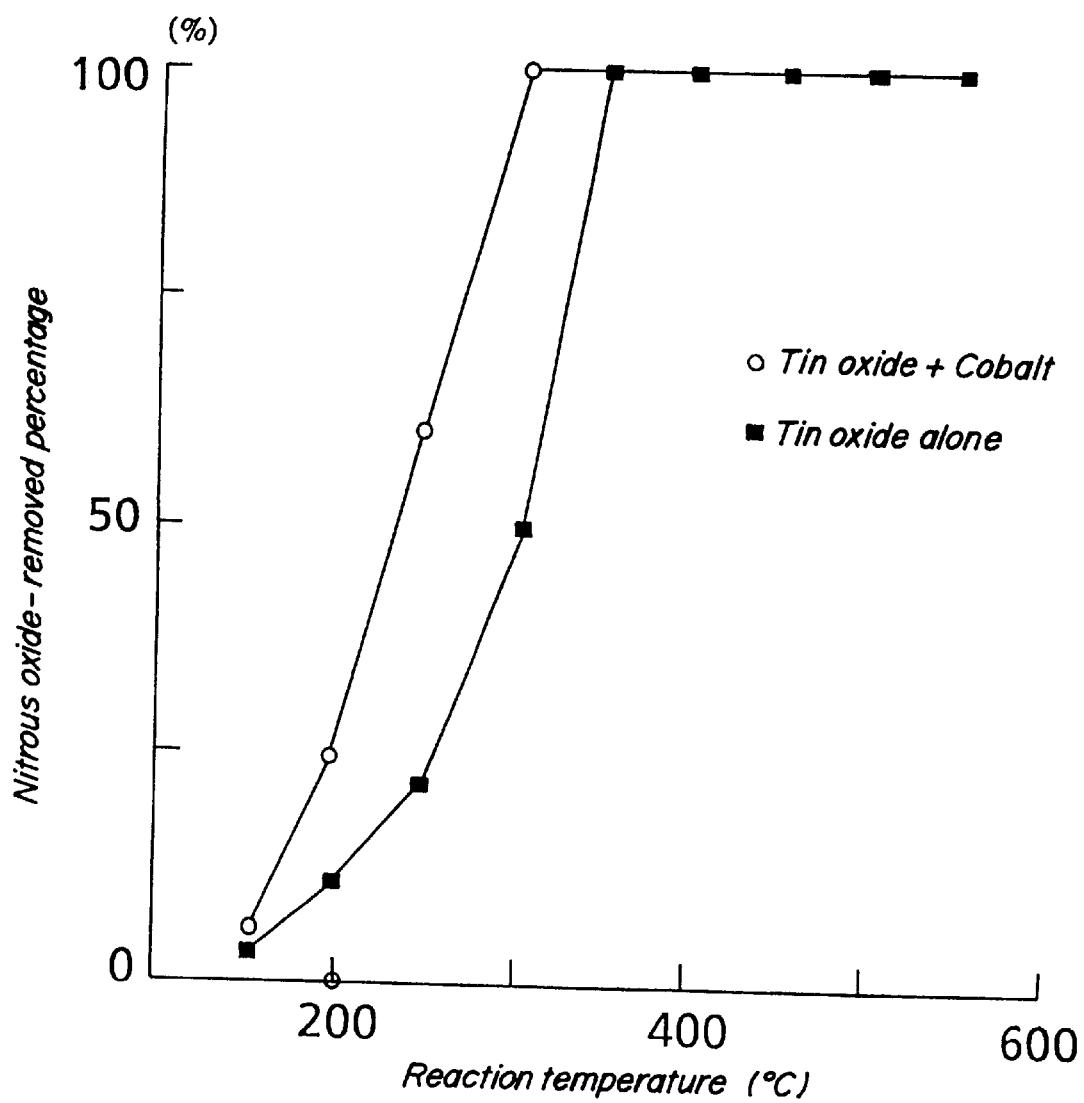
FIG. 5 is a graph for showing the relationship between the reaction temperature and the nitrous oxide-removed percentage in Example 4.

Experimental results are shown in a graph of FIG. 5. It was confirmed that when the reaction temperature is not less than 200° C., the nitrous oxide-removed percentage increases, and that nitrous oxide can be completely removed particularly when the reaction temperature is set at not less than 300° C. Therefore, it was confirmed that the addition of the cobalt compound enhances the activity of the catalyst, and lowers the reaction temperature by about 50° C. as compared with a case where no cobalt compound is added.

EXAMPLE 5

A catalyst in which tin oxide added with cobalt acetate was carried onto titanium oxide was experimentally evaluated in the same evaluation way as in Example 2. As the catalyst was used a catalyst which was obtained by dissolving commercially available tin chloride in ethyl alcohol, adding powdery titanium oxide into the solution to obtain a slurry, distilling the solvent under reduced pressure, feeding the resultant into distilled water again to obtain a slurry, adding 1% cobalt acetate as a co-catalyst to the slurry, distilling off the water under reduced pressure, press molding the resultant in the form of pellets, crushing the pellets and screening the powder at 28 to 48 meshes. The catalyst was used as packed in the reacting glass tube 2 after firing at 550° C. for 2 hours and spontaneous cooling as a preliminary treatment.

Figure 6:
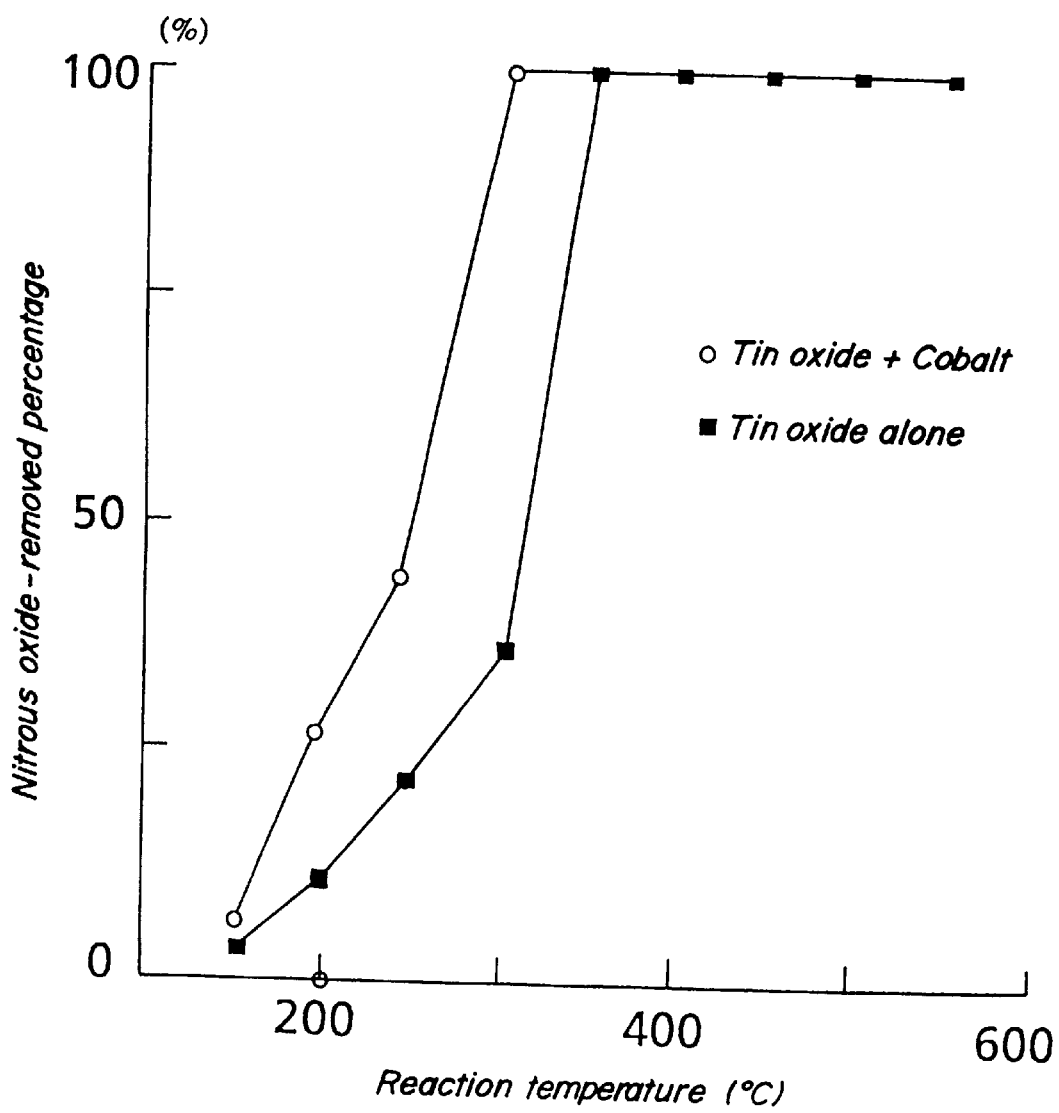
FIG. 6 is a graph for showing the relationship between the reaction temperature and the nitrous oxide-removed percentage in Example 5.

Results are shown in a graph of FIG. 6. It was confirmed that when the reaction temperature is not less than 200° C., the nitrous oxide-removed percentage increases, and that nitrous oxide can be completely removed particularly when the reaction temperature is set at not less than 300° C. Therefore, it was also confirmed that the addition of the cobalt compound enhances the activity of the catalyst, and lowers the reaction temperature by about 50° C. as compared with a case where no cobalt compound is added.

EXAMPLE 6

A catalyst in which tin oxide added with cobalt acetate was carried onto a catalyst layer made of titanium oxide was experimentally evaluated in the same evaluation way as in Example 3. As the catalyst was used a catalyst which was obtained by dissolving commercially available tin chloride in ethyl alcohol, impregnating the resulting solution into the catalyst layer made of titanium oxide, further impregnating an aqueous solution of cobalt acetate into the resulting catalyst layer, and firing it at 550° C. for 6 hours.

Figure 7:
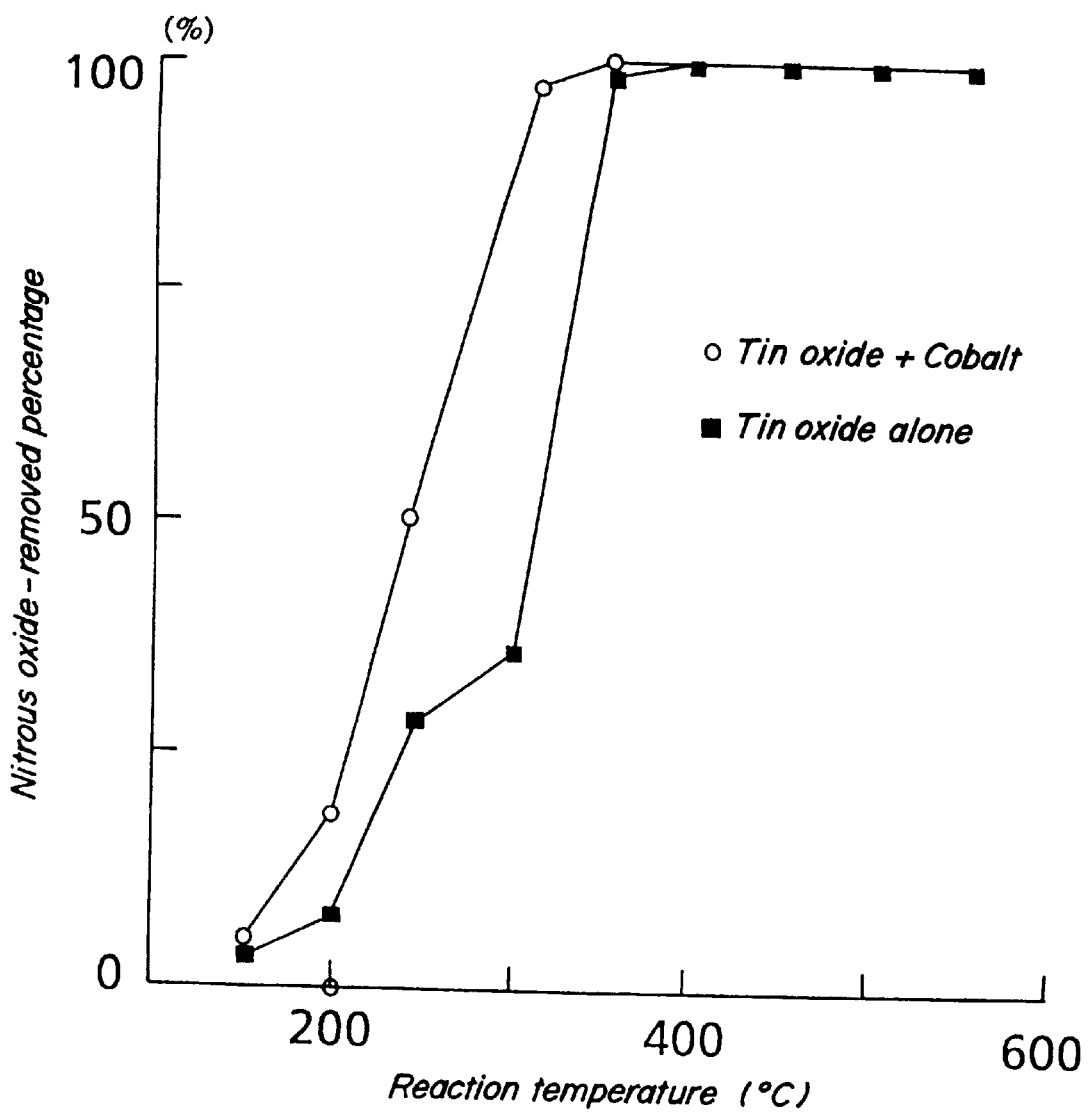
FIG. 7 is a diagram for showing the relationship between the reaction temperature and the nitrous oxide-removed percentage in Example 6.

Results are shown in a graph of FIG. 7. It was confirmed that when the reaction temperature is not less than 200° C., the nitrous oxide-removed percentage increases, and that nitrous oxide can be completely removed particularly when the reaction temperature is set at not less than 350° C. Therefore, it was also confirmed that the addition of the cobalt compound enhances the activity of the catalyst, and lowers the reaction temperature by about 50° C. as compared with a case where no cobalt compound is added. Further, it was confirmed that the invention process is free from influence with other materials coexisting in the exhaust gas.

INDUSTRIAL APPLICABILITY

The nitrous oxide-removing process according to the present invention can be used for effectively remove nitrous oxide discharged from the sludge-incinerating furnace or boiler fine powder coal combustion furnace.

What is claimed is:

1. A process for removing nitrous oxide in a gas in a gas-treatment by contacting the gas with a catalyst layer, wherein nitrous oxide is directly decomposed by contacting said gas with a catalyst at a reaction temperature not less than 250° C. and less than 600° C., said catalyst layer being composed mainly of tin (IV) oxide and formed by firing at 500° C. to 700° C. for 2 to 6 hours.

2. The nitrous oxide-removing process set forth in claim 1, wherein the reaction temperature at which the gas is contacted with the catalyst is set at not less than 350° C.

3. The nitrous oxide-removing process set forth in claim 1, wherein $TiO_2$ is used as a carrier for said catalyst layer, and use is made of a $TiO_2$ carrier-carried catalyst layer formed by immersing said $TiO_2$ carrier into an alcohol solution of tin chloride, followed by drying and firing.

4. The nitrous oxide-removing process set forth in claim 1, wherein said gas contains NOx and SOx and after NOx and SOx in said gas are removed therefrom, the treated gas is contacted with said catalyst layer.

5. A process for removing nitrous oxide in a gas in a gas-treatment by contacting the gas with a catalyst layer, wherein nitrous oxide is directly decomposed by contacting said gas with a catalyst at a reaction temperature not less than 200° C. and less than 600° C., said catalyst layer being composed mainly of tin (IV) oxide and added with a cobalt (II) as a co-catalyst compound and being formed by firing at 500° C. to 700° C. for 2 to 6 hours.

6. The nitrous oxide-removing process set forth in claim 5, wherein the reaction temperature is set at not less than 300° C.

7. The nitrous oxide-removing process set forth in claim 5, wherein a catalyst layer formed by immersing powdery tin oxide into an aqueous solution of a cobalt salt, followed by drying and firing, is used.

8. The nitrous oxide-removing process set forth in claim 5, wherein an addition amount of said cobalt compound is 0.5 to 5 wt %.

9. The nitrous oxide-removing process set forth in claim 5, wherein $TiO_2$ is used as a carrier for said catalyst layer, and a $TiO_2$ carrier-carried catalyst layer is used.

10. The nitrous oxide-removing process set forth in claim 5, wherein $TiO_2$ is used as a carrier for said catalyst layer, and use is made of a $TiO_2$ carrier-carried catalyst layer formed by immersing said $TiO_2$ carrier into an alcohol solution of tin chloride, followed by drying, then immersing the resulting catalyst layer into an aqueous solution of a cobalt salt, followed by drying and firing.

11. The nitrous oxide-removing process set forth in claim 5, wherein said gas contains NOx and SOx and after NOx and SOx in said gas are removed therefrom, the treated gas is contacted with said catalyst layer.

* * * * *